US006785794B2

(12) United States Patent
Chase et al.

(10) Patent No.: US 6,785,794 B2
(45) Date of Patent: Aug. 31, 2004

(54) DIFFERENTIATED STORAGE RESOURCE PROVISIONING

(75) Inventors: Jeffrey S. Chase, Durham, NC (US); Ronald P. Doyle, Raleigh, NC (US); David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 10/147,795

(22) Filed: May 17, 2002

(65) Prior Publication Data

US 2003/0217245 A1 Nov. 20, 2003

(51) Int. Cl.[7] ............................................... C06F 12/00
(52) U.S. Cl. ..................... 711/170; 711/148; 711/151; 711/154; 711/158; 710/18; 718/105
(58) Field of Search ................................ 711/170, 148, 711/151, 154, 158; 710/18; 718/105

(56) References Cited

U.S. PATENT DOCUMENTS

| | | | | |
|---|---|---|---|---|
| 5,960,451 A | * | 9/1999 | Voigt et al. | 711/114 |
| 6,327,622 B1 | * | 12/2001 | Jindal et al. | 709/228 |
| 6,393,458 B1 | * | 5/2002 | Gigliotti et al. | 709/203 |
| 6,415,323 B1 | * | 7/2002 | McCanne et al. | 709/225 |
| 6,606,690 B2 | * | 8/2003 | Padovano | 711/148 |

OTHER PUBLICATIONS

B. Mitchell, *Introduction to NAS—Network Attached Storage, Dedicated Network Devices Provide Affordable, Easy Access to Data, Computer Networking*, <http://compnetworking.about.com/library/weekly/aa070101a.htm>, (visited May 8, 2002).

B. Mitchell, *Introduction to NAS—Network Attached Storage, The Terms "NAS" and "SAN" Often Get Confused, Computer Networking*, <http://compnetworking.about.com/library/weekly/aa070101b.htm>, (visited May 8, 2002).

R. Russell, *Raid for Faster, Cheaper Storage, Computer Peripherals*, <http://peripherals.about.com/library/weekly/aa082300a.htm>, (Aug. 23, 2000).

*Policy–Based Network Architecture*, Allot Communications.
*Service Level Agreement (SLA) and Quality of Service (QoS) for Communications Server for OS/390 Users, IBM SecureWay Software*, <http://www–3.ibm.com/software/network/info/hostsolution/iband/white_sla_qos.html>, (visited May 17, 2002).

A.R. Abdul Rahman, *Service Level Agreements: An Overview*, <http://www.doc.ic.ac.uk/~arar98/article/>, (visited May 17, 2002).

S. Lee, *SLA Performance Metrics*, <http://www.doc.ic.ac.uk/~sl98/article1/>, (visited May 17, 2002).

S. Lee, *Quality of Service and the SLA*, <http://www.doc.ic.ac.uk/~sl98/article2/>, (visited May 17, 2002).

\* cited by examiner

*Primary Examiner*—Nasser Moazzami
*Assistant Examiner*—Mehdi Namazi
(74) *Attorney, Agent, or Firm*—Jerry W. Herndon, Esq.; Steven M. Greenberg, Esq.; Christopher & Weisberg, P.A.

(57) ABSTRACT

A method for enforcing a service discrimination policy in a storage system. The service discrimination policy enforcement method can include monitoring load metrics for physical resources required to access content stored within the storage system. A request to access the content stored within the storage system can be received. A corresponding guaranteed service level can be identified from the request. In consequence, a particular one of the physical resources can be selected to service the request based upon a determination that the selected physical resource can service the request while satisfying the guaranteed service level at a load indicated by the monitored load metrics.

15 Claims, 4 Drawing Sheets

DIFFERENTIATED STORAGE RESOURCE PROVISIONING

BACKGROUND OF THE INVENTION

1. Statement of the Technical Field

The present invention relates to a policy based service differentiation model and more particularly to the management of physical resources in a storage system.

2. Description of the Related Art

The vast majority of network devices process device requests indiscriminately. That is, regardless of the identity of the requester or the type of request, each device request can be processed with equal priority. Given the exponential increase in network traffic across the Internet, however, more recent network-oriented computing devices have begun to provide varying levels of computing services based upon what has been referred to as a "policy based service differentiation model".

In a policy based service differentiation model, the computing devices can offer many levels of service where different requests for different content or services which originate from different requestors receive different levels of treatment depending upon administratively defined policies. In that regard, a service level agreement (SLA) can specify a guaranteed level of responsiveness associated with particular content or services irrespective of any particular requester. By comparison, quality of service (QoS) terms specify a guaranteed level of responsiveness minimally owed to particular requestors.

The policy based service differentiation model is the logical result of several factors. Firstly, the number and variety of computing applications which generate requests across networks both private and public has increased dramatically in the last decade. Each of these applications, however, has different service requirements. Secondly, technologies and protocols that enable the provision of different services having different levels of security and QoS have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

As device requests flow through the network and ultimately, to a file system, storage systems provide the terminal point of data access. More particularly, in response to any data request originating in a network, a file storage device such as disk media ultimately physically retrieves the requested data. Accordingly, data caching systems at all levels of the network replicate data that ultimately can be physically retrieved from file storage. Like other elements of the network, however, In high request volume circumstances, response times attributable to file storage access can add considerable costs to the overall response time.

Notably, storage centers such as a network attached storage (NAS) or redundant array of inexpensive disks (RAID) systems provide an abstraction layer such that disk assignment and block allocations remain hidden from data requestors. Yet, at some level in each of these storage centers, the allocation of data to particular physical blocks on particular physical storage media must occur. This physical allocation of data to portions of the storage medium can directly relate to which physical disk read arms can be used to access requested data. Still, presently physical device resources in the storage center are allocated indiscriminately without regard to the identity of a data requestor or the type of data requested.

SUMMARY OF THE INVENTION

The present invention overcomes the limitations of conventional, nondiscriminatory storage systems and provides a novel and non-obvious discriminatory storage system and method for enforcing a service discrimination policy. In accordance with the present invention, a discriminatory storage system can include storage media having physical resources for accessing content stored in the storage media. A storage system controller can be coupled to the physical resources, the storage system controller provisioning individual ones of the physical resources to respond to requests to access the content. In one aspect of the invention, the storage system can include a NAS and the storage system controller can include a NAS controller. Alternatively, the storage system can include a RAID system and the storage system controller can include a RAID controller.

Notably, a resource monitor can be configured to monitor load metrics for the physical resources. In consequence, a service level policy enforcement processor can be programmed to access service level terms. Service level terms include those rules or obligations which guarantee a certain level of responsiveness or availability according to the identity of a corresponding service level partner, such as a data provider, data consumer, an intermediate component in the path of the data transmission, or the identity of the data itself. For example, the service level terms can include QoS terms or terms from an SLA. Based upon the service level terms and the load metrics, individual ones of the physical resources can be selectively provisioned to respond to requests to access the content stored in the storage media.

Notably, in one aspect of the present invention, one or more pre-programmed block layout processes can be provided. In that case, the service level policy enforcement process can be further programmed to allocate blocks in the storage media using a selected one of the block layout processes according to the service level terms.

In a storage system, a service discrimination policy enforcement method can include monitoring load metrics for physical resources required to access content stored within the storage system. A request to access the content stored within the storage system can be received. A corresponding guaranteed service level can be identified from the request. In consequence, a particular one of the physical resources can be selected to service the request based upon a determination that the selected physical resource can service the request while satisfying the guaranteed service level at a load indicated by the monitored load metrics. Significantly, the physical resources can include those components required to access data stored in the storage system, such as disk arms, disk heads, and the like.

In one aspect of the present invention, the identifying step can include identifying a source for the access request; and, matching the identified source with a guaranteed level of service specified according to QoS terms. In a second aspect of the present invention, the identifying step can include identifying a source for the content; and, matching the identified source with a guaranteed level of service specified in an SLA. In that regard, the method can further include receiving a request to write content to the storage system;

identifying from the write request a corresponding guaranteed service level; selecting a particular pre-programmed block allocation process configured to allocate blocks in the storage system; and, servicing the write request using the selected block allocation process.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an enhanced storage system management facility. The enhanced storage system management facility of the present invention can provision the physical resources of an associated storage management system discriminately, according to the terms of a service discrimination policy. In particular, a service discrimination policy enforcement process can allocate the physical resources of storage media according to either the type of data requested, or the identity of the requester. For instance, the service discrimination policy enforcement process can provision the physical resources of storage media according to QoS terms, or the terms of an SLA.

Figure 3:
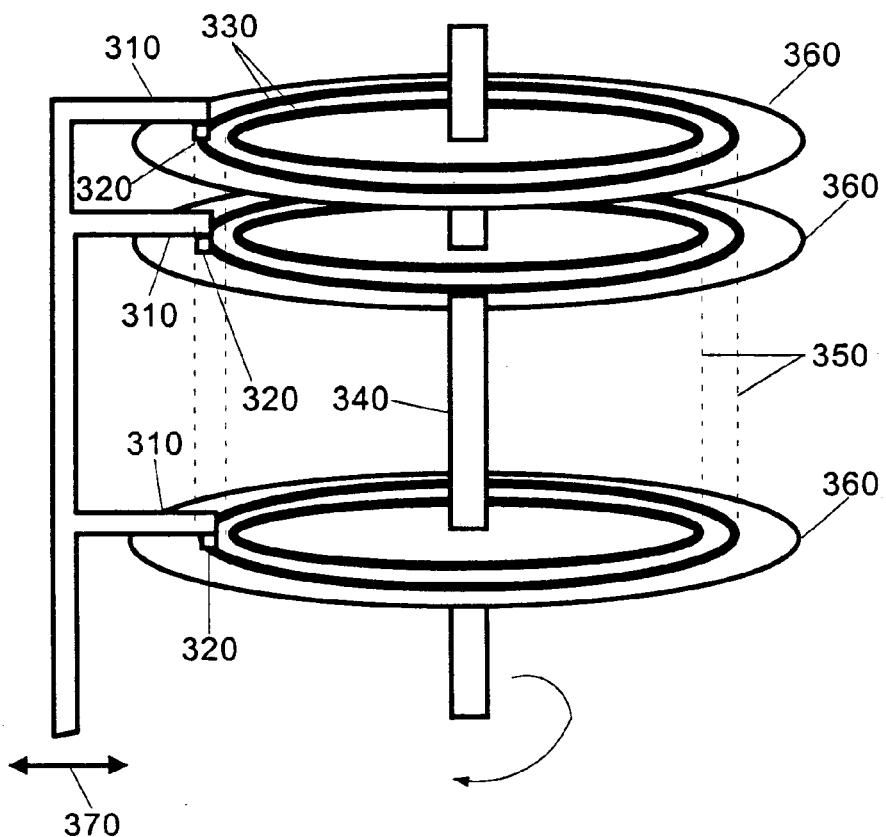

Notably, the physical resources of storage media refers to one or more of the physical device components required to physically perform data read operations in the storage device. For example, FIG. 3 is a generalized schematic illustration of a disk storage device known in the art. As shown in FIG. 3, a conventional disk storage device can include one or more platters 360 coupled to a rotatable spindle 340. Each platter 360 can include magnetic media upon which data can be physically stored and subsequently retrieved through a writing and reading process, respectively. The reading and writing processes can be performed with disk heads 320 affixed to disk arms 310. The disk arms 310 can traverse the surfaces of the rotating platters 360 as indicated by the arrows 370 in FIG. 3.

The disk storage device can be logically formatted according to well-known file system formats. Specifically, each platter 360 can be subdivided into a series of tracks 330. The tracks 330 can be viewed conceptually as a series of concentric cylinders 350. Each track 330 can be subdivided into one or more sectors. In consequence, the disk storage device can be logically organized into a set of blocks, each block representing a logical unit of transfer and including one or more sectors. Hence, the physical resources of conventional disk media can include one or more of those physical components required to access data stored on the disk media.

As will be recognized by one skilled in the art, response time of an access request data stored within the disk media illustrated in FIG. 3 can include the sum of the time required for the disk heads 320 to move to the correct cylinder 350 and the time consumed for the desired block to rotate under the disk head 320. Thus, conceptually it will be apparent that some elements of the physical resources of the disk media can become more heavily loaded than other elements of the physical resources. As a result, in accordance with the present invention, the load of the physical resources can be monitored and particular ones of the physical resources can be selected to respond to disk access requests according to the terms of the service discrimination policy.

Importantly, though FIG. 3 relates particularly to disk media such as a hard disk drive, the invention is not so limited merely to fixed disk media. Rather, the method of the present invention relates to the selective allocation of the physical resources of a storage system. As such, other types of storage media can suffice in lieu of magnetic media. For example, it is well known in the art that optical storage devices require the use and allocation of physical resources to access data stored in optical media. In particular, compact disk and digital versatile disk drives require the provisioning of a laser read head across a track to access blocks, sectors and tracks of rotating optical media. By comparison, tape drives require the provisioning of tape read/write heads and rotating spindles.

Figure 1A:
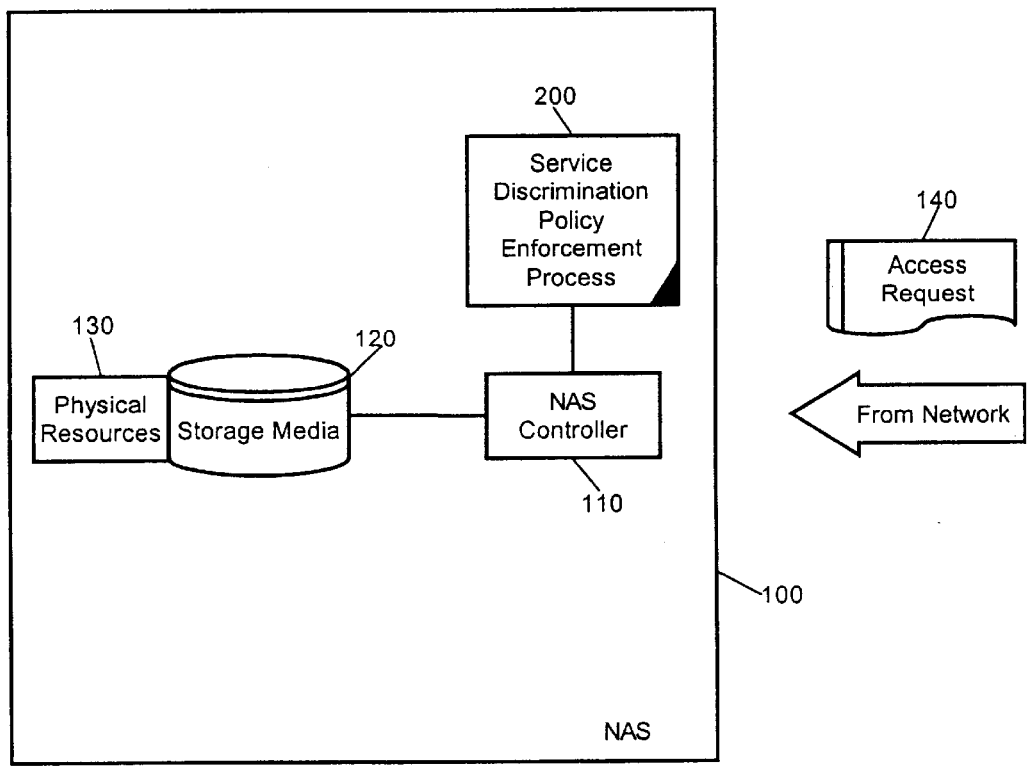
FIG. 1A is a block diagram illustrating a NAS which has been configured with a service discrimination policy enforcement process in accordance with the inventive arrangements.

FIG. 1A is a block diagram illustrating a NAS system 100 which has been configured with a service discrimination policy enforcement process in accordance with the inventive arrangements. In accordance with one aspect of the present invention, an access request 140 can be received from the network in the NAS system 100. A NAS controller 110 can pass the access request 140 to the service discrimination policy enforcement process 200.

The service discrimination policy enforcement process 200 can analyze the properties of the access request 140, for instance the type of data requested, or the identity of the requestor. The service discrimination policy enforcement process 200 also can review the current load of the physical resources 130 associated with the storage media 120. Based upon the properties of the access request 140, the service discrimination policy enforcement process 200 can apply the terms of a corresponding service discrimination policy to select elements of the physical resources 130 to satisfy the access request 140.

Figure 1B:
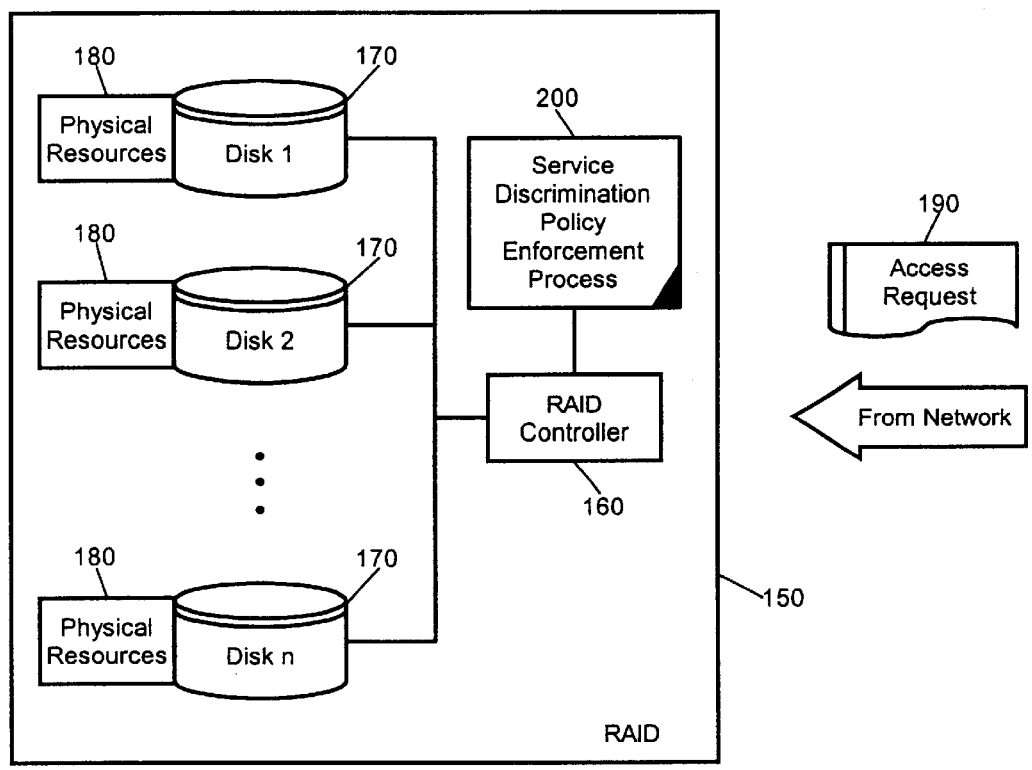
FIG. 1B is a block diagram illustrating a RAID system which has been configured with a service discrimination policy enforcement process in accordance with the inventive arrangements.

The present invention is not to be limited merely to the NAS system 100, however. Rather, in another aspect of the invention, the service discrimination policy enforcement process 200 can be included as part of or in association with a RAID system. FIG. 1B is a block diagram illustrating an exemplary RAID system which has been configured with a service discrimination policy enforcement process in accordance with the inventive arrangements. In the RAID system 150 of FIG. 1B, an access request 190 can be received and processed by the RAID controller 160.

The RAID controller 160 can pass the access request 190 to the service discrimination policy enforcement process 200. The service discrimination policy enforcement process 200 can analyze the properties of the access request 190, for instance the type of data requested, or the identity of the requestor. The service discrimination policy enforcement process 200 also can review the current load of the physical resources 180 associated with each disk 170 of the RAID system 150. Based upon the properties of the access request 190, the service discrimination policy enforcement process 200 can apply the terms of a corresponding service discrimination policy to select elements of the physical resources 180 to satisfy the access request 190.

In accordance with a preferred aspect of the present invention, two customer differentiation approaches can incorporate the enhanced storage management facility of the present invention. Both approaches can be conceptualized from the flow chart of FIG. 2. In a first approach, an SLA can be established for customer owned content within the storage system. A storage management facility, such as the service discrimination policy enforcement process 200 of FIGS. 1A and 1B, can apply block layout techniques to the disk or disks in the storage system to guarantee available read bandwidth for storage access requests, based upon the terms of the SLA.

Figure 2:
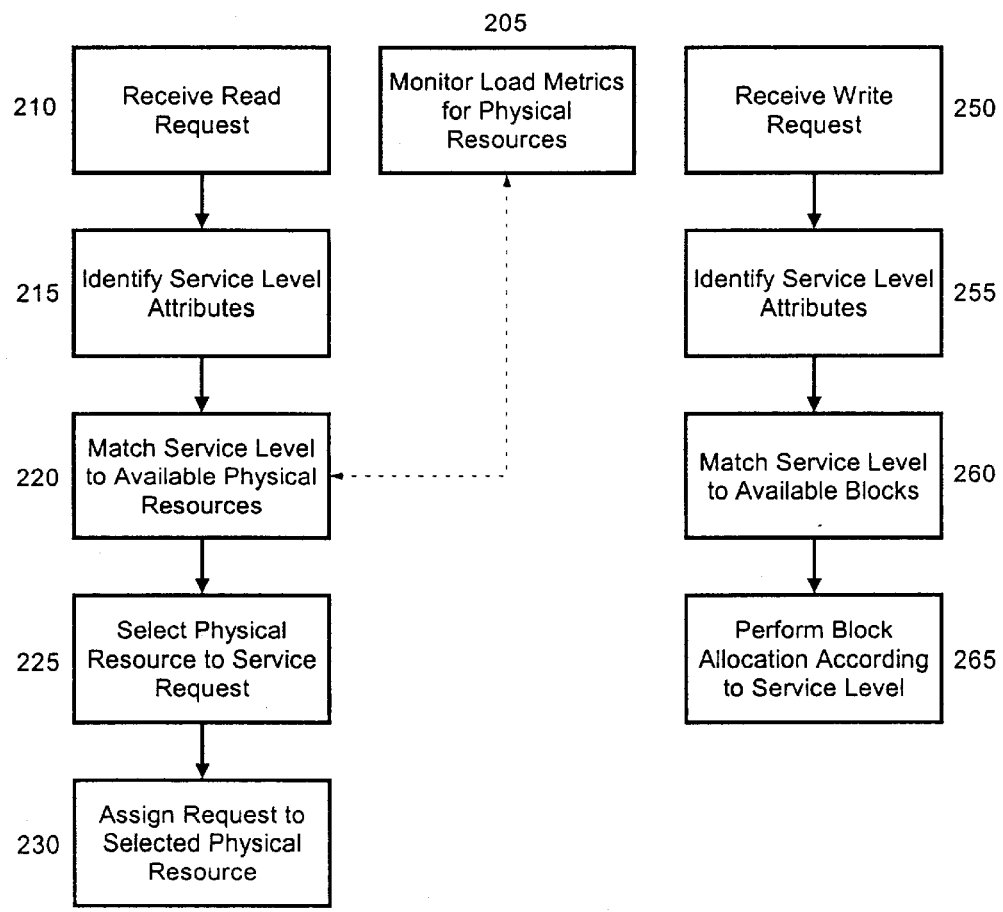
FIG. 2 is a flow chart illustrating a service discrimination policy enforcement process; and, FIG. 3 is a generalized schematic illustration of a disk storage device known in the art.

This process is illustrated in steps 250 through 265 of FIG. 2. Specifically, upon receiving a write request in step 250, the service level attributes of the write request can be identified in step 255 and in step 260 a suitable block layout technique can be applied prior to allocating blocks in the storage media during a write process in step 265. Notably, during the block allocation process, content replication also can be performed in accordance with the terms of the SLA.

Subsequently, the storage system can respond to read requests for the content in a manner most likely to satisfy the terms of the SLA inasmuch as the particular block layout technique selected can accelerate the time required to access the requested data on disk. In that regard, though the invention is not limited to any particular block layout technique, several block layout techniques are known in the art, including same sector/block, same track, same cylinder and adjacent cylinder. The first approach can incorporate not only selectable block layout techniques in order to enhance the responsiveness of the storage system according to the terms of the SLA, but also the first approach can incorporate the selective provisioning of the physical resources of the storage system to enhance the responsiveness of the storage system according to the terms of the SLA.

Specifically, as illustrated in steps 205, and 210 through 230 of FIG. 2, as access requests are received in the storage system, the load experienced by elements of the physical resources can be monitored and suitable ones of the elements can be selected to retrieve the data based upon the terms of the SLA. More particularly, in step 205, the load experienced by elements of the physical resources can be monitored conceptually. The elements can include, for example, individual disk arms, disk heads, platters, cylinders, laser heads, tape read/write heads, and the like. The monitoring process can report on demand, or periodically the measured loads.

In step 210, a read request for data can be received and in step 215, service level attributes associated with the requested data can be identified. In step 220, the terms of the SLA specific to the identified service level can be matched to the available physical resources of the storage system as indicated by the reported load. In step 225, certain ones of the loaded physical resources can be selected to service the access request and in step 230 the request can be assigned to the selected physical resource.

A second customer differentiation approach can provide QoS to customers based not upon the identity of the owner of requested content, but upon the identity of the requestor. In this regard, higher priority requests can be routed to less loaded physical resources. Again, as illustrated in steps 205, and 210 through 230 of FIG. 2, as access requests are received in the storage system, the load experienced by elements of the physical resources can be monitored and suitable ones of the elements can be selected to retrieve the data based upon the terms of the SLA.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A storage system comprising:

storage media comprising physical resources for accessing content stored in said storage media;

a storage system controller coupled to said physical resources, said storage system controller provisioning individual ones of said physical resources to respond to requests to access said content;

a resource monitor configured to monitor load metrics for said physical resources; and, a service level policy enforcement processor programmed to access service level terms and, based upon said service level terms and said load metrics, to selectively provision individual ones of said physical resources to respond to requests to access the content stored in said storage media.

2. The storage system of claim 1, further comprising:

a plurality of pre-programmed block layout processes, wherein said service level policy enforcement process is further programmed to allocate blocks in said storage media using a selected one of said block layout processes according to said service level terms.

3. The storage system of claim 1, wherein said service level terms comprise one of Quality of Service (QoS) terms and terms from a Service Level Agreement (SLA).

4. The storage system of claim 1, wherein said storage system comprises network attached storage (NAS) and said storage system controller comprises a NAS controller.

5. The storage system of claim 1, wherein said storage system comprises a redundant array of inexpensive disks (RAID) system and said storage system controller comprises a RAID controller.

6. In a storage system, a service discrimination policy enforcement method comprising the steps of:

monitoring load metrics for physical resources required to access content stored within the storage system;

receiving a request to access said content stored within the storage system;

identifying from said access request a corresponding guaranteed service level; and, selecting a particular one of said physical resources to service said request based upon a determination that said selected particular one of said physical resources can service said request while satisfying said guaranteed service level at a load indicated by said monitored load metrics.

7. The method of claim 6, further comprising the steps of:

receiving a request to write content to said storage system;

identifying from said write request a corresponding guaranteed service level;

selecting a particular pre-programmed block allocation process configured to allocate blocks in said storage system; and, servicing said write request using said selected block allocation process.

8. The method of claim 6, wherein said identifying step comprises the steps of:

identifying a source for said content; and, matching said identified source with a guaranteed level of service specified in a service level agreement (SLA).

9. The method of claim 6, wherein said identifying step comprises the steps of:

identifying a source for said access request; and, matching said identified source with a guaranteed level of service specified according to Quality of Service (QoS) terms.

10. The method of claim 6, wherein said selecting step comprises the step of:

selecting a particular disk arm to service said request based upon a determination that said selected disk arm can service said request while satisfying said guaranteed service level at a load indicated by said monitored load metrics.

11. In a storage system, a machine readable storage having stored thereon a computer program for enforcing a service discrimination policy, said computer program comprising a routine set of instructions for causing the machine to perform the steps of:

monitoring load metrics for physical resources required to access content stored within the storage system;

receiving a request to access said content stored within the storage system;

identifying from said access request a corresponding guaranteed service level; and, selecting a particular one of said physical resources to service said request based upon a determination that said selected particular one of said physical resources can service said request while satisfying said guaranteed service level at a load indicated by said monitored load metrics.

12. The machine readable storage of claim 11, further comprising the steps of:

receiving a request to write content to said storage system;

identifying from said write request a corresponding guaranteed service level;

selecting a particular pre-programmed block allocation process configured to allocate blocks in said storage system; and, servicing said write request using said selected block allocation process.

13. The machine readable storage of claim 11, wherein said identifying step comprises the steps of:

identifying a source for said content; and, matching said identified source with a guaranteed level of service specified in a service level agreement (SLA).

14. The machine readable storage of claim 11, wherein said identifying step comprises the steps of:

identifying a source for said access request; and, matching said identified source with a guaranteed level of service specified according to Quality of Service (QoS) terms.

15. The machine readable storage of claim 11, wherein said selecting step comprises the step of:

selecting a particular disk arm to service said request based upon a determination that said selected disk arm can service said request while satisfying said guaranteed service level at a load indicated by said monitored load metrics.

* * * * *